US006645637B2

(12) United States Patent
Kaltenborn et al.

(10) Patent No.: US 6,645,637 B2
(45) Date of Patent: Nov. 11, 2003

(54) EXTINGUISHING MEDIUM FOR QUENCHING ELECTRIC ARCS SCOPE

(75) Inventors: Uwe Kaltenborn, Baden-Dattwil (CH); Jens Rocks, Ennetbaden (CH); Pal Kristian Skryten, Skien (NO)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/867,654

(22) Filed: May 31, 2001

(65) Prior Publication Data

US 2002/0004547 A1 Jan. 10, 2002

(30) Foreign Application Priority Data

Jun. 7, 2000 (EP) .......................................... 00810495

(51) Int. Cl.$^7$ .................................................. B32B 9/04

(52) U.S. Cl. ....................... 428/447; 524/405; 524/424; 524/430; 524/436; 524/444; 524/449; 524/450; 524/456; 524/492; 524/493; 524/497; 528/15; 528/31; 528/32

(58) Field of Search ............................. 528/15, 31, 32; 524/492, 493, 497, 588, 405, 424, 430, 436, 444, 449, 450, 456; 428/447

(56) References Cited

U.S. PATENT DOCUMENTS

| | | | | | |
|---|---|---|---|---|---|
| 3,070,559 A | * | 12/1962 | Nitzsche et al. | 260/DIG. 33 |
| 3,166,656 A | | 1/1965 | Hollmann et al. | |
| 3,528,941 A | * | 9/1970 | Murphy | 524/864 |
| 3,912,650 A | * | 10/1975 | Khalid et al. | 252/63.5 |
| 3,929,660 A | | 12/1975 | Khalid | |
| 4,444,671 A | | 4/1984 | Wiltgen, Jr. | |
| 4,755,554 A | * | 7/1988 | Itoh et al. | 524/588 |
| 5,326,589 A | * | 7/1994 | Okinoshima et al. | 427/102 |
| 5,402,307 A | * | 3/1995 | Kuriyama | 361/534 |
| 5,406,245 A | | 4/1995 | Smith et al. | |
| 5,444,106 A | * | 8/1995 | Zhou et al. | 523/107 |
| 5,446,346 A | * | 8/1995 | Nilssen | 315/209 R |
| 5,903,208 A | * | 5/1999 | Sorger | 337/159 |
| 6,063,487 A | * | 5/2000 | Azechi et al. | 428/325 |
| 6,407,159 B2 | * | 6/2002 | Sugimoto et al. | 524/425 |

FOREIGN PATENT DOCUMENTS

| | | | | |
|---|---|---|---|---|
| DE | 4416093 A1 | | 11/1994 | |
| RU | 2034876 C1 | * | 5/1995 | C08K/5/00 |

OTHER PUBLICATIONS

Abstract of JP 9–223451.

* cited by examiner

*Primary Examiner*—Robert Dawson
*Assistant Examiner*—Marc S. Zimmer
(74) *Attorney, Agent, or Firm*—Burns, Doane, Swecker & Mathis, L.L.P.

(57) ABSTRACT

Extinguishing medium in pasty to solid form for quenching electric arcs, consisting of a silicone polymer or a mixture of such silicone polymers, with the silicone polymer or the mixture of silicone polymers containing a mineral compound or a mixture of such compounds in powder form as a filler; use of the extinguishing medium to quench electric arcs in overcurrent-protection elements, in electronics and microelectronics; in high-voltage engineering; or in repeating fuses, and electrical devices, machines and systems which contain an extinguishing medium according to the invention.

24 Claims, No Drawings

EXTINGUISHING MEDIUM FOR QUENCHING ELECTRIC ARCS SCOPE

This Application claims priority under 35 U.S.C §119 and/or 365 to application Ser. No. 00810495.2 filed in Europe on June 7, 2000; the entire content of which is hereby incorporated by reference.

The present invention relates to an extinguishing medium for quenching electric arcs in electrical machines, preferably in overcurrent-protection elements, such as fuses in general, for example household fusible cutouts, high-voltage/high-breaking-capacity fuses (h.v.h.b.c. fuses) in the distribution network or substrate fuses, which can be used from electronics to high-voltage engineering or in repeating fuses, for example in PTC elements (PTC=positive temperature coefficient). The extinguishing medium according to the invention consists of a pasty to solid silicone matrix, which is filled with selected mineral fillers, and has a substantially improved quenching characteristic. The extinguishing medium according to the invention provides a substantially improved switching characteristic in said applications, for example h.v.h.b.c. fuses, which contain an extinguishing medium according to the invention.

TECHNICAL FIELD

Extinguishing media for quenching electric arcs in electrical machines, for example in fuses, are known per se. The function of the extinguishing medium in electrical fuses is for the extinguishing medium to absorb sufficient energy from the electric arc, or to cool the electric arc so strongly, that it is quenched during the current zero crossing. Sand is generally used as an extinguishing medium. The switching characteristic of a fuse that contains sand is therefore substantially influenced by the composition of the extinguishing sand and by its average grain size distribution and grain shape. Very different extinguishing sands are therefore employed by various manufacturers.

PRIOR ART

U.S. Pat. No. 4,444,671 or U.S. Pat. No. 5,406,245 disclose the use, for cooling electric arcs in electrical fuses, of organic compounds and their optional application to the fuse wire as a coating. For instance, it has been proposed to use liquid polymers such as polyurethanes, polyacrylates, melamine-formaldehyde resins, and mixtures of such polymeric compounds, or hexamethylenetetramine. In this case, the polymer decomposes in contact with the hot electric arc, and this quenches the arc. However, the use of said compounds generally has the disadvantage that degradation phenomena occur. In addition, these compounds frequently produce electrically conductive decomposition products when they decompose in the electric arc, and the environmental compatibility of these decomposition products is often questionable. Furthermore, the dielectric strength of the fuse is impaired after the current has been switched off, so that thermal re-striking of the electric arc must be reckoned with.

DESCRIPTION OF THE INVENTION

Two working ranges must be taken into account for an h.v.h.b.c. fuse, namely the one in the case of small overcurrents up to 10 $I_n$ ($I_n$=rated current, also denoted $I_{nominal}$) and the one in the case of large fault currents. Large fault currents are relatively simple to deal with by introducing weak points into the current path, in a manner which is known per se. When a sufficiently high potential difference is produced via the root voltage, these weak points cause quenching of the electric arcs at the current zero crossing.

For small overcurrents, a very different switching response takes place in conventional fuses. At the center of the fuse, a tin particle (M-spot, Metcalf effect) is applied to the fuse wire. When the fuse is heated by an overcurrent, the tin diffuses into the silver. The resulting intermetallic $AgSn_2$ phase has a significantly lower melting point than the basic material (silver) and melts at the point where enough tin has diffused into the silver wire. An electric arc is formed at this point. This electric arc is then quenched by the extinguishing medium, generally quartz sand, owing to the absorption of energy which takes place when the sand melts. In order to provide enough energy to melt the sand, the fault current must generally be at least three times higher than the rated current of the fuse. In the event of smaller currents, on the one hand the electric arc cannot grow correspondingly since the energy is not sufficient to melt the roots on the fuse element (wire) but, on the other hand, the electric arc cannot be quenched because the energy is not sufficient to melt the fuse sand to the required extent. The electric arc therefore continues to burn stably over a defined path within the fuse. The heat energy which is then delivered in a locally limited way leads to a heightened thermal gradient within the fuse in the region where the electric arc is burning, which may cause the fuse to explode. In order to make it possible, in spite of this, to interrupt currents that lie between the rated current and the minimum switch-off current of about $3I_N$, it is necessary to improve the cooling of so-called low-current electric arcs.

It has now been found that silicone polymers, preferably in pasty to solid form, which contain mineral compounds that are known per se in a suitable form and concentration as fillers, represent excellent extinguishing media for quenching electric arcs in electrical fuses. Using the extinguishing media according to the invention, it is possible to interrupt or quench electric arcs which are produced by currents that are below the minimum switch-off current of about $3I_N$ and currents that are significantly smaller than the rated current, without occurrence of the disadvantages described above. For instance, electric arcs at 0.67 times the rated current $I_N$ can be quenched using the extinguishing medium according to the invention.

Using the extinguishing medium according to the invention, even very fine particles of media that have a cooling effect can be positioned in large amounts directly and permanently in the vicinity of the expected electric arc. The cooling power is significantly improved owing to the large surface area of the fine particles, with scarcely any conductive and no highly toxic decomposition products being produced during the oxidation of the silicone by the electric arc. By using the extinguishing medium according to the invention for electric arc quenching, the dimensions of fuses, such as e.g. h.v.h.b.c. fuses, can be significantly reduced with the same performance. In addition, the distance between parallel fuse wires, which is currently at least about 16 mm, can be reduced greatly to about 1 mm when using the extinguishing medium according to the invention, without causing a short-circuit between spiral turns of the fuse wire during or after the switching process. This offers the possibility of fitting a significantly longer wire inside the fuse, for the same standardized dimensions, with spiral winding of the fuse wires. The length of the wire, which is identical to the electrical insulation path after the fuse has been tripped, determines the maximum voltage for which the fuse can be used. When the extinguishing medium according to the invention is employed, it is possible to increase the 36 kV voltage, which is currently counted as an upper limit, and to produce fuses for up to 110 kV or more with a compact structure. The improved cooling and arc quenching according to the invention also reduces costs when producing h.v.h.b.c. fuses, since e.g. the hitherto used fuse body can be configured for significantly lower pressures.

The present invention is defined in the patent claims. In particular, the present invention relates to an extinguishing medium in pasty to solid form for quenching electric arcs, consisting of a silicone polymer or a mixture of such silicone polymers, characterized in that this silicone polymer or the mixture of the silicone polymers contains at least one mineral compound or a mixture of such compounds in powder form as a filler, preferably with an average grain size in the range of from 500 nm to 500 $\mu$m and in a concentration of at least 10 percent by weight, expressed in terms of the total weight of the extinguishing medium.

The present invention furthermore relates to the use of the extinguishing medium according to the invention to quench electric arcs in overcurrent-protection elements, preferably in fuses, for example in household fusible cutouts, in high-voltage/high-breaking-capacity fuses (h.v.h.b.c. fuses) in the distribution network or substrate fuses, in electronics, micro-electronics or in high-voltage engineering or in repeating fuses, preferably in PTC elements.

The present invention furthermore relates to overcurrent-protection elements, preferably fuses, substrate fuses in electronics, in microelectronics or in high-voltage engineering, repeating fuses, preferably PTC elements, which contain an extinguishing medium according to the invention.

The present invention also relates to a method for producing the electrical devices according to the invention, in particular fuses, as described below.

Suitable starting products for producing the extinguishing medium according to the invention are flowable, preferably curable, cyclic, straight-chain or branched organopolysiloxanes or a mixture of such compounds. These are preferably liquid to pasty, so that the filler can be incorporated in a comparatively high concentration. The compound which is produced from the starting polymer and contains the filler generally has a significantly higher viscosity than the starting polymer itself, and may optionally be used uncured. Preferably, however, a curable polysiloxane or a curable polysiloxane mixture, which cures at room temperature or at elevated temperature, preferably by addition polymerization or alternatively by condensation polymerization, is used in order to produce the extinguishing medium according to the invention.

Preferably, the organopolysiloxane is a compound, or a compound mixture, of the general formula (I):

(I)

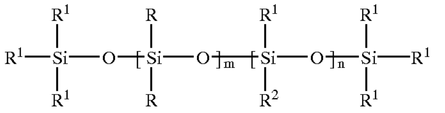

wherein

R independently of each other denote an alkyl radical having from 1 to 8 carbon atoms, $(C_1-C_4)$ alkylaryl or aryl; preferably an alkyl radical having from 1 to 4 carbon atoms or phenyl; preferably methyl;

$R^1$ independently of each other denote one of the meanings of R or $R^2$ and, optionally, two end substituents $R^1$ bonded to different Si atoms may collectively stand for an oxygen atom (=cyclic compound);

$R^2$ denotes one of the meanings of R, or hydrogen, or an $-(A)r-CH=CH_2$ radical;

A denotes a $-C_sH_{2s}-$ radical, preferably $-(CH_2)_s-$, wherein s denotes an integer from 1 to 6, preferably 1;

r denotes zero or one;

m denotes on average from zero to 5000, preferably from 20 to 5000, preferably from 50 to 1500;

n denotes on average from zero to 100, preferably from 2 to 100, preferably from 2 to 20;

the sum of [m+n] for non-cyclic compounds being preferably at least 20, and preferably at least 50, and the groups $-[Si(R)(R)]-$ and $-[Si(R^1)(R^2)O]-$ being arranged in an arbitrary order in the molecule. The sum of [m+n] for non-cyclic compounds is preferably on average in the range of from 20 to 5000, and preferably in the range of from 50 to 1500.

Preferably, $R_2$ has one of the meanings of R, with R preferably denoting methyl or phenyl, and both methyl and phenyl may be present in the molecule. The ratio of methyl to phenyl is given by the flowability or processability and fillability of the compound or of the compound mixture. R preferably denotes methyl. The compound of the formula (I) generally represents a mixture of homologous compounds of the formula (I), which is known to the person skilled in the art.

If the compound of the formula (I) is a cyclic organohydrogenpolysiloxane or an organovinylpolysiloxane, then it is made up of $-[Si(R)(R)O]-$ units and/or $-[Si(R^1)(R^2)O]-$ units, e.g. only of $-[SiH(R^2)O]-$ units, which form a ring having preferably from 4 to 12 such units. Among the siloxanes in ring form, however, the oligomeric polydimethylsiloxanes in ring form having from 4 to 8 siloxy units are preferred.

In a preferred embodiment of the present invention, a curable silicone-resin molding composition is used as a curable mixture consisting of two components. In one of the components, $R^2$ denotes hydrogen for at least some of the molecules present in that component. In the other component, $R^2$ denotes $-A-CH=CH_2$ for at least some of the molecules present in this other component. In order to facilitate the addition-crosslinking reaction, a coordination compound or a mixture of such coordination compounds from the group comprising rhodium, nickel, palladium and/or platinum metals, as are explicitly described in the literature as catalytically active compounds for addition reactions between SiH bonds and alkenyl radicals and are known to the person skilled in the art, are added to one and/or the other component or to the mixture of both components. Pt(O) complexes having alkenylsiloxanes as ligands or Rh catalysts in catalytic amounts of preferably from 1 to 100 ppm platinum, calculated in terms of the amount of the compounds that contain the reactive groups, are preferred. For this two-component system, both end silyloxy groups of the compound that contains the $-A-CH=CH_2$ radical, independently of each other, preferably denote dimethylvinylsiloxy, in which case n preferably denotes zero. The individual starting components preferably have a viscosity in the range of from about 10 cSt to 10,000 cSt, preferably in the range of from 100 cSt to 10,000 cSt and preferably in the range of from 500 cSt to 3000 cSt, measured according to DIN 53 019 at 20° C.

To produce the extinguishing medium according to the invention, the two components—the catalyst and the filler—are mixed in an arbitrary order, then the still flowable mixture which is obtained is used e.g. by converting it into the desired shape or applying it to the fuse wire or introducing it into the fuse, and allowing the mixture to cure. In this case, the hydrogensilane compound and the vinylsilane compound are used at least in equimolar amounts to produce the curable silicone-resin molding composition. Preferably, however, the compound that contains Si—H groups is used in a molar excess of from 20 to 50%, expressed in terms of the compound that contains the —A—CH=$CH_2$ radical. In the same way, it is possible to use systems where the catalyst has already been introduced into the resin and/or curing-agent component prior to mixing.

Depending on the production method, the compounds of the formula (I) may contain up to 10 molar percent, calculated in terms of the Si atoms that are present, of both alkoxy and OH groups. Such compounds are within the present invention.

According to the invention, it is also possible to use condensation-crosslinking silicone-resin systems. Condensation-crosslinking silicone-resin systems are known per se. They crosslink, in particular, because of the [≡Si—OH] groups that are present, which form [≡Si—O—Si≡] bridges during the crosslinking process. Compared with addition-crosslinking systems, however, condensation-crosslinking systems have the disadvantage that cleavage products, in particular water, are formed during the crosslinking or curing and this may cause corrosion of failure of the fuse according to the invention.

A large number of silicone compounds and curable silicone-resin molding compositions are known for use in electrical engineering and are commercially available, for example under the brand names Basilon® (Bayer AG), Textolite® (General Electric Co.) or Wacker Silicones (Wacker Chemie GmbH, DE). These silicones may be used according to the invention. Silicone rubbers or starting compositions of silicone resins, which yield crosslinked silicone rubbers when cured, are preferred.

In this case, the ceramic tube that is generally used and externally seals the fuse may be replaced, in a fuse according to the invention, by any other suitable material, for example a suitable silicone material. If such fuses are exposed to open-air conditions, then it is advantageous if, besides curable straight-chain and/or branched organopolysiloxanes, the cured silicones also contain cyclic compounds of the formula (I), especially those which contain from 3 to 10, preferably from 4 to 6 and especially four, siloxy units in the ring as described above for the compounds of the formula (I).

Virtually all fuse sands that are known per se and mineral fillers that are known in the electricity industry may be used for producing the extinguishing medium according to the invention. Examples of suitable fillers hence include the following materials: natural purified sands (purified crushed rocks), silicon oxide ($SiO_2$), aluminum oxide ($Al_2O_3$), titanium oxide ($TiO_2$), silicates, such as sodium/potassium silicates, silicon aluminosilicates, mineral carbonates, such as e.g. calcium-magnesium carbonate [e.g. $CaMg(CO_3)_2$], or the various calcium-silicon-magnesium carbonates and other physical and chemical mixtures of these compounds. Geopolymers, such as e.g. trolites and/or zeolites based on aluminosilicates or other alkaline earth metals, glasses, mica, such as micromica and/or ceramic particles. Furthermore, boric acid, metal hydroxides, such as aluminum hydroxide and/or magnesium hydroxide and/or mineral substances that contain water of hydration, such as e.g. aluminum oxide that contains water of hydration ($Al_2O_3.xH_2O$), may also be used as a filler. Compounds that contain magnesium ions ($Mg^{2+}$) are preferred. In particular, compounds (natural and synthetic sands etc.) that contain silicon, aluminum and/or magnesium ions are preferred, for example $MgCO_3$, $Mg(OH)_2.4MgCO_3.4H_2O$, $Mg(OH)_2$; $MgO$; $MgCl_2.5Mg(OH)_2.7H_2O$.

For example, the use of aluminum oxide which has been dried before use at elevated temperature, e.g. at 600° C., is preferred. A filler as a two-phase or multi-phase mixture, consisting of silicon dioxide, aluminum oxide, aluminum trihydrate, magnesium hydroxide and/or titanium dioxide, is also preferred, with the extinguishing medium containing about 40–80% by weight, expressed in terms of the total weight of the extinguishing medium. Boric acid which has been dried for a few minutes (preferably at most 15 minutes) at 80° C. before processing, is also preferably used as a filler.

The average grain size or particle size of the filler material is preferably in the range of from 500 nm to 500 μm, preferably in the range of from 10 μm to 250 μm. For coarser average grain sizes, the diameters are preferably in the range of from 20 μm to 150 μm, preferably in the range of from 30 μm to 130 μm. For finer average grain sizes, the diameters are preferably in the range of from 500 nm to 50 μm, preferably in the range of from 0.5 μm to 10 μm. The average grain size distribution, or particle size distribution, is not critical and preferably lies in the standard ranges, as are known for fillers when they are incorporated into polymers. Surface modification, e.g. silanizing the fillers, is also possible in this case.

The proportion of the filler in the silicone resin is preferably in the range of from 5% by weight to 95% by weight, preferably in the range of from 40% by weight to 85% by weight, and in particular in the range of from 60% by weight to 80% by weight, calculated in terms of the total weight of filler and polymer. It is preferable to employ fill factors at the physically achievable upper limit, for which flowability or processing of the uncured mixture is just still feasible, which is generally obtained with a fill factor of about 80% by weight. The extinguishing medium according to the invention is produced in such a way that it contains only very few air inclusions, and virtually none.

If just fuse sand or granular mineral filler (without silicone resin) is used as the extinguishing medium in an h.v.h.b.c. fuse, then significantly stronger cooling of the arc is obtained when the extinguishing medium has a finer average grain size since, in the case of smaller particles that are to be melted, a greater particle surface area is available to absorb energy from the electric arc and the particles hence melt more rapidly. However, a comparatively fine-grained sand generally consists of rounded particles, which leads to a different trip characteristic and hence an impaired quenching response (compared with coarse sand). This is because not only the available particle surface area, or the average grain size, is important for the quenching characteristic, but inter alia the grain shape too. If a coarse sand is used as a cooling medium, then the fuse switches faster for the same current. The poorer thermal conductivity of the air, of which larger volumes are present in coarse sands, has the effect that the pronounced corners and spikes of the coarse sand are melted more rapidly in the electric arc and hence initially provide faster and better cooling (compared with very fine sand). Because of the large proportion of air and its poor thermal conductivity, this advantage can become a substantial disadvantage when the overall switching characteristic of the fuse is considered. For instance, although coarser sand exhibits a rapid response and a good quenching ability for small overcurrents in the range $3I_N<I_C<8I_N$ (wherein $I_C$ denotes a variable in the range of from $3I_N$ to $8I_N$), it nevertheless has a poor quenching ability for high currents in the range $I_C>8I_N$.

Fine sand exhibits a slow response and has the advantage of a good quenching ability for high currents in the range $I_C>8I_N$, but has a poor quenching ability for small overcurrents in the range $3I_N<I_C<8I_N$. In addition, the problem of separation and solidification of the fine particles occurs in the case of fine sand, and in the course of the operating life of a fuse—about 25 years—this can lead to the creation of a fairly large air-filled cavity in the fuse, which entails the risk of explosion during switching because of the poor thermal conductivity of air.

Surprisingly, the extinguishing medium according to the invention is distinguished by a very good quenching ability for all currents in the range $0.5I_N<I_C<I_{MAX}$ ($I_{MAX}$=maximum switch-off current), which in turn permits greater flexibility in the design of the trip characteristic. The excellent quenching ability of the extinguishing medium according to the invention, which is preferably filled uniformly with a fine-grained filler, can be explained by the cooling of the arc by the large available surface area of the filler, on the one hand, and the readily oxidizing silicone resin, on the other. This synergistic effect of the combination according to the invention was not to be expected.

The present invention also relates to a method for producing the electrical devices according to the invention, in particular fuses, which is characterized in that a liquid to pasty silicone compound or a mixture of such silicone compounds is uniformly mixed with a suitable filler or a mixture of such fillers in the desired concentration in an arbitrary order, the mixture obtained is converted into a desired shape and/or applied to the fuse wire of the device and/or introduced into the interior of the device and the mixture is subsequently cured or allowed to cure, optionally prior and/or subsequent to the introduction into the interior of the fuse.

In this regard, it is possible to process or cure the liquid to pasty silicone composition filled according to the invention to form solid shaped parts, such as e.g. tubes, elliptical tubes or elongate elements having a trapezoidal cross section, which can be fitted over the fuse element, with or without a support, onto the support of the fuse element. Furthermore, the silicone composition filled according to the invention may be applied directly onto the fuse wire or onto the fuse element and subsequently cured, in which case the silicone composition may for example be applied by dipping, brushing, trickling or pouring. Another possibility involves fixing by means of shrink-fit tubing, in which case both the silicone resin filled according to the invention and optionally additional cold or hot shrink-fit tubing may be provided with cold or hot shrinkage properties. Vulcanization of individual components is also conceivable, such as e.g. vulcanization of separate segments of the fuse element, of the fuse-element support, of the fuse body (on the inside) or of the fuse element proper.

The extinguishing medium according to the invention is used according to the invention to quench possible electric arcs in electrical devices, machines and systems, preferably in overcurrent-protection elements, for example fuses in general, household fusible cutouts, high-voltage/high-breaking-capacity fuses (h.v.h.b.c. fuses) in the distribution network or substrate fuses. The extinguishing medium according to the invention can be employed in all fields from microelectronics up to high-voltage engineering, as well as in repeating fuses, for example in PTC elements. Examples of such fuses include the ABB (CEF) 12 kV-6 A (backup) fuse or ABB (CEF) 24 kV-63 A fuse; the EFEN 6/12 kV-6.3 A (all-purpose) fuse; the FERRAZ 12 kV-6.3 A (all-purpose) fuse; the SIBA 6/12 kV-16 A (all-purpose) fuse; in each case with a ceramic extinguishing medium; the Bussmann High Voltage 12 kV-80 A (full-range) H.R.C. fuse whose fuse elements rest on a glass support, with surface vitrification and a ceramic extinguishing medium. Details regarding the dimensions, constituent parts and functional parameters, or electrical properties, of such fuses can be found in the respective catalogs published by the manufacturing companies. Examples of such catalogs include: HH-Sicherungseinsätze mit Temperatur-Begrenzer [h.v.h.b.c. fuse inserts with temperature limiters], reference HH1-03/97, from SIBA Sicherungsbau GmbH, Borker Straße 22, D-44534 Lünen, Germany or the catalog Bussmann, High Voltage Products, reference HVP-98, Bussmann Division, Cooper (UK) Ltd, Burton-on-the-Wolds, Leicestershire, LE12 5TH UK (further information at http://www.bussmann.com), or the catalog HH-Sicherungen, HH-Sicherungsträger [h.v.h.b.c. fuses, h.v.h.b.c. fuse supports], March 1998 edition, EFEN Elektrotechnische Fabrik GmbH, P.O. Box 1254, D-65332 Eltville, Germany. See also the CD-ROM, Interactive Catalog Ferraz 1999. As mentioned above, however, the extinguishing medium according to the invention is not only usable in fuses, but throughout the range of low-voltage engineering, electronics and microelectronics up to high-voltage engineering for quenching electric arcs. Electric arcs that need to be quenched are also encountered in electronics.

During the production of overcurrent-protection elements, the extinguishing media according to the invention may be bonded to the substrates, i.e. in particular ceramic or glass, onto which the fuse elements are applied. To that end, the surfaces are cleaned (ultrasound, degreasing e.g. using isopropanol or ethanol) and brushed, dipped or sprayed with a primer, for example DOW CORNING 1200 OS primer. The primer is allowed to dry and the casting composition, or extinguishing medium, is subsequently processed preferably within 24 hours. This prevents even minimal air gaps between the silicone or the extinguishing medium and the winding assembly.

The other examples serve to explain the invention.

EXAMPLE 1 a) 100 grams of the addition-crosslinking silicone resin Powersil® 600 from Wacker Chemie AG, Germany, which contains a platinum catalyst, are prepared at room temperature in the ratio 9:1 (9 parts of component A and one part of component B). In this case, using a bar stirrer at 700 revolutions per minute, 400 grams of quartz powder of the grade W10 (grain size distribution in the range of up to 130 μm, 86% smaller than 40 μm) from Quarzwerke Frechen GmbH, Frechen, Germany are introduced into resin component A, which contains the crosslinking agent, and processed to form a homogeneous mixture, so that the final mixture contains 80% by weight of quartz powder, expressed in terms of the total weight of the mixture. After the addition of this component that contains the catalyst, the mixture is stirred for ten minutes at 700 revolutions per minute until the mixture is fully homogeneous and is subsequently evacuated in a vacuum vessel at 100 Pa for 10 minutes in order to remove the air inclusions. The flowable mixture can now be used as an extinguishing medium.

b) The mixture obtained in section a) is then applied by pouring onto the fuse element, which has been wound on a star-shaped support. A silicone layer having a thickness of from 1 to 3 mm is in this case formed, which is cured at room temperature (4 h), or for which the curing process is accelerated by heating in the oven (80–120° C.) or using a hot-air stream (0.5 h). A minimum switch-off current ($I_{min}$) of 2.4 $I_N$ ($I_{test}$=150 A) was measured in the case of a type 24 kV/63 A CEF fuse produced using this extinguishing medium. The minimum switch-off current of a type 24 kV/63 A CEF fuse, which for comparison contains conventional quartz sand for fuses as an extinguishing medium, is $I_{min}$=3.2 $I_N$.

EXAMPLE 2 a) Example 1 is repeated, but by using the addition-crosslinking silicone system, i.e. the casting composition Q3-6305 A/B from Dow Corning, USA. This two-component system has a lower viscosity compared with the Wacker system used in Example 1. Components A and B are mixed in the ratio 10:1. In this case as well, 90 grams of component A are first stirred thoroughly with the filler, for example the quartz powder W12EST from Quarzwerke Frechen, in a vessel using a bar stirrer at 700 revolutions per minute, and stirred for a further 10 minutes until fully homogeneous. This component is then storable. Before pouring, 10 grams of component B are added and the entire mixture is stirred for a further 10 minutes at 700 revolutions per minute. The final pouring composition is subsequently evacuated at 100 Pa until all the air inclusions are removed.

b) The mixture obtained in a) is further processed in the following way. The winding bar with the fuse elements is placed it a mold having a cylindrical cavity. This mold, which is treated using a wax-type release agent (QZ XY, Ciba SC Ltd, CH), is filled with the mixture in a container at 100 Pa, so that no air-filled cavities are created. The container is then opened after the bubbles have been extracted from the molding. The molded body is crosslinked in a similar way to Example 1 at room temperature or at elevated temperature.

c) Example 2, paragraph b) is modified by injecting the extinguishing medium produced in paragraph a) by means of injection molding.

A minimum switch-off current ($I_{min}$) of 1.0 $I_N$ ($I_{test}$=40.8 A) was measured in the case of a type 24 kV/40 A CEF fuse produced using this extinguishing medium [according to paragraph b] and paragraph c]]. The minimum switch-off current of a type 24 kV/40 A CEF fuse, which for comparison contains standard quartz sand for fuses as an extinguishing medium, is $I_{min}$, 3.2 $I_N$.

EXAMPLE 3

Example 2 is repeated, except that the quartz powder is replaced by aluminum oxide $Al_2O_3$, 0–30 μm, from Hermann C. Starck Berlin GmbH & Co. KG, with the aluminum oxide being dried for 120 minutes at 600° C. before use. The filling factor is 60% by weight. A minimum switch-off current ($I_{min}$) of 0.67 $I_N$ was measured in the case of a type 24 kV/40 A CEF fuse produced using this extinguishing medium.

EXAMPLE 4

Example 2 is repeated, except that the quartz powder is replaced by powdered industrial boric acid from Siegfried CMS AG, with the boric acid having been dried for 15 minutes at 80° C. and subsequently comminuted in a ball mill that has agate balls with a diameter of 10 mm before use. The filling factor is 60% by weight. A minimum switch-off current ($I_{min}$) of 0.67 $I_N$ was measured in the case of a type 24 kV/40 A CEF fuse produced using this extinguishing medium.

EXAMPLE 5

Example 2 is repeated, except that the quartz powder is replaced by a mixture of aluminum trihydrate SB 434 from Solem Division, J. M. Huber Corp. USA (weight ratio of $Al(OH)_3$:$Mg(OH)_2$=1:1), with the mixture having been dried for 15 minutes at 80° C. before use. The filling factor is 65% by weight. A minimum switch-off current ($I_{min}$) of 1.7 $I_N$ was measured in the case of a type 24 kV/68 A CEF fuse produced using this extinguishing medium.

EXAMPLE 6

Example 2 is repeated, except that the quartz powder is replaced by aluminum oxide E 600, 0–1 μm, from Saint Gobain Industrial Ceramics (USA), with the aluminum oxide having been dried for 120 minutes at 600° C. before use. The filling factor is 40% by weight. A minimum switch-off current ($I_{min}$) of 0.67 $I_N$ was measured in the case of a type 24 kV/40 A CEF fuse produced using this extinguishing medium.

What is claimed is:

1. A method of quenching electrical arcs in an electrical apparatus comprising fuse elements by applying to said fine element an electric arc extinguishing medium in pasty to solid form, consisting of a silicone polymer or a mixture of silicone polymers and at least one mineral filler, wherein (i) said silicone polymer or the mixture of the silicone polymers optionally is a curable polysiloxane or a curable polysiloxane mixture, and (ii) at least one of said at least one mineral filler has an average grain size in the range of from 500 nm to 500 μm and is selected from the group consisting of natural purified sands; silicon oxide; aluminum oxide; titanium oxide; silicates; mineral carbonates; geopolymers; glasses, mica, ceramic particles; boric acid, metal hydroxides; mineral substances that contain water of hydration; $MgCO_3$; $Mg(OH)_2$; and MgO.

2. A method as claimed in claim 1, wherein the filler has an avenge grain size in the range of from 10 μm to 250 μm.

3. A method as claimed in claim 1, wherein it contains the filler in a concentration of at least 10 percent by weight, expressed in terms of the total weight of the extinguishing medium.

4. A method as claimed in claim 1, wherein said curable polysiloxane or said curable polysiloxane mixture cures at room temperature or at elevated temperature by the mechanism of addition polymerization or condensation polymerization.

5. A method as claimed in claim 1, wherein the organopolysiloxane represents a compound, or a compound mixture, of the general formulae (I) and/or (IA):

(I)

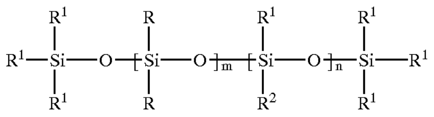

(IA)

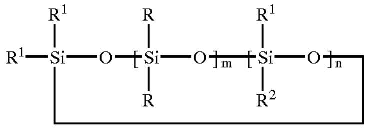

wherein

R independently of each other denote an alkyl radical having from 1 to 8 carbon atoms, ($C_1$–$C_4$) alkylaryl or aryl; preferably an alkyl radical having from 1 to 4 carbon atoms or phenyl; preferably methyl;

$R_1$ independently of each other denote one of the meanings of R or $R_2$;

$R_2$ denotes one of the meanings of R, or hydrogen, or an $—(A)_r—CH{=}CH_2$ radical;

A denotes a $—C_sH_{2s}—$ radical, preferably $—(CH_2)_s—$, wherein s denotes an integer from 1 to 6;

r denotes zero or one;

m denotes on average from zero to 5000;

n denotes on average from zero to 100;

the sum of [m+n] for non-cyclic compounds being at least 20;

the sum of [m+n] for cyclic compounds being 3 to 11; and the groups $—[Si(R)(R)O]—$ and $—[Si(R_1)(R_2)O]—$ being arranged in an arbitrary order in the molecule.

6. A method as claimed in claim 5, wherein the siloxane of the formula (I) represents a non-cyclic compound, wherein the sum of [m+n] is on average in the range of from 20 to 5000.

7. A method as claimed in claim 5, wherein the siloxane of the formula (I) represents a non-cyclic compound, wherein the sum of [m+n] is on average in the range of from 50 to 1500.

8. A method as claimed in claim 5, wherein the compound of the formula (IA) represents a cyclic organohydrogenpolysiloxane which is made up of $—[SiH(R_2)O]—$ units, and which form a ring having from 4 to 12 of said units.

9. A method as claimed in claim 5, wherein the compound of the formula (IA) represents a cyclic organohydrogenpolysiloxane which is made up of $—[SiH(R_2)O]—$ units, and which form a ring having from 4 to 12 of said siloxy units.

10. A method as claimed in claim 5, wherein the extinguishing medium is present as a curable mixture consisting of two components, wherein, in one of the components, $R_2$ denotes hydrogen for at least some of the molecules present in tat component and, in the other component, $R_2$ denotes $—A—CH{=}CH_2$ for at least some of the molecules present in this other component.

11. A method as claimed in claim 4, wherein, in order to facilitate the addition-crosslinking reaction, it contains a coordination compound or a mixture of such coordination compounds from the group comprising rhodium, nickel, palladium and/or platinum metals.

12. A method as claimed in claim 4, wherein it contains a condensation-crosslinking silicone-resin system.

13. A method as claimed in claim 1, wherein said at least one mineral filler is selected from the group comprising sodium/potassium silicates, silicon aluminosilicates; calcium-magnesium carbonate or calcium-silicon-magnesium carbonates; trolites and/or zeolites based on aluminosilicates or other alkaline earth metals, aluminum hydroxide, magnesium hydroxide; aluminum oxide that contains water of hydration; $Mg(OH)_2.4MgCO_3.4H_2O$ and $MgCl_2.5Mg(OH)_2.7H_2O$.

14. A method as claimed in claim 1, wherein said at least one mineral filler has an average grain size in the range of from 20 μm to 150 μm.

15. A method as claimed in claim 1, wherein said at least one mineral filler has an average grain size in the range of preferably in the range of from 30 μm to 130 μm.

16. A method as claimed in claim 1, wherein said at least one mineral filler has an average grain size in the range of from 500 nm to 50 μm.

17. A method as claimed in claim 1, wherein said at least one mineral filler has an average grain size in the range of from 0.5 μm to 10 μm.

18. A method as claimed in claim 1, wherein the proportion of said at least one mineral filler in the silicone resin is in the range of from 5% by weight to 95% by weight, calculated in terms of the total weight of filler and polymer.

19. A method as claimed in claim 1, wherein the proportion of said at least one mineral filler in the silicone resin is in the range of from 40% by weight to 85% by weight, calculated in terms of the total weight of filler and polymer.

20. A method as claimed in claim 1, wherein the proportion of said at least one mineral filler in the silicone resin is in the range of from 60% by weight to 80% by weight, calculated in terms of the total weight of filler and polymer.

21. A method according to claim 1, wherein said fuse element is an overcurrent-protection element, preferably in fuses, preferably in household fusible cutouts, in high-voltage/high-breaking-capacity fuses in the distribution network or substrate fuses; in electronics, microelectronics; in high-voltage engineering; or in repeating fuses, preferably in PTC elements.

22. An electrical apparatus comprising;

at least one fuse element; and an electric arc extinguishing medium applied to the at least one fuse element;

wherein the electric arc extinguishing medium is in pasty to solid form and consists of a silicone polymer or a mixture of silicone polymers and at least one mineral filler, (i) said silicone polymer or the mixture of the silicone polymers optionally is a curable polysiloxane or a curable polysiloxane mixture, and (ii) at least one of said at least one mineral filler has an average grain size in the range of from 500 nm to 500 μm and is selected from the group consisting of natural purified sands; silicon oxide; aluminum oxide; titanium oxide; silicates; mineral carbonates; geopolymers; glasses, mica, ceramic particles; boric acid, metal hydroxides; mineral substances that contain water of hydration; $MgCO_3$; $Mg(OH)_2$; and MgO.

23. The electrical apparatus of claim 22, wherein said at least one fuse element is aligned and placed in a housing by means of the silicone composition.

24. The electrical apparatus of claim 22, wherein said at least one fuse element is at least one of:

an overcurrent-protection element;

in a fuse;

in a household fusible cutout;

in a high-voltage/high-breaking-capacity fuse in a distribution network;

in a substrate fuse;

in electronics;

in microelectronics;

in high-voltage engineering; and in a repeating fuse, preferably in one or more PTC elements.

* * * * *